(12) United States Patent
Sakai

(10) Patent No.: US 8,961,640 B2
(45) Date of Patent: Feb. 24, 2015

(54) FILTER

(75) Inventor: Hiraku Sakai, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 14/118,397

(22) PCT Filed: Dec. 27, 2011

(86) PCT No.: PCT/JP2011/080303
§ 371 (c)(1),
(2), (4) Date: Nov. 18, 2013

(87) PCT Pub. No.: WO2012/157148
PCT Pub. Date: Nov. 22, 2012

(65) Prior Publication Data
US 2014/0083064 A1    Mar. 27, 2014

(30) Foreign Application Priority Data

May 19, 2011    (JP) ................. 2011-112768

(51) Int. Cl.
*F02M 35/022*    (2006.01)
*B04C 5/103*    (2006.01)
(Continued)

(52) U.S. Cl.
CPC .............. *B04C 5/103* (2013.01); *B01D 45/16* (2013.01); *B04C 5/06* (2013.01); *B04C 5/13* (2013.01); *F04B 39/16* (2013.01)
USPC ............... 55/449; 55/447; 55/428; 55/429; 55/457; 55/423; 55/430; 55/396; 55/456

(58) Field of Classification Search
USPC .......... 55/449, 447, 428–429, 457, 423, 430, 55/396, 456
See application file for complete search history.

(56) References Cited

U.S. PATENT DOCUMENTS

| 3,490,209 A | 1/1970 | Fernandes et al. |
| 3,507,098 A * | 4/1970 | Veres et al. .............. 96/409 |

(Continued)

FOREIGN PATENT DOCUMENTS

| DE | 3624086 A1 | 1/1988 |
| JP | S29-4388 | 4/1954 |

(Continued)

OTHER PUBLICATIONS

International Search Report for PCT Serial No. PCT/JP2011/080303 dated Feb. 28, 2012.

(Continued)

*Primary Examiner* — Dung H Bui
(74) *Attorney, Agent, or Firm* — McCormick, Paulding & Huber LLP

(57) ABSTRACT

This filter is used for purifying air by removing foreign matters such as liquid droplets contained in the air. A separation unit is formed by a primary port, a port block to which a secondary port is formed, and a separation cylinder attached to the port block. Inside a swirl flow generating chamber of the separation unit, a cylinder blade portion formed by arranging a plurality of blades, which are extended in an axial direction along an inner peripheral surface and also inclined in a circumferential direction, in a cylindrical form is provided. The air flowed into the swirl flow generating chamber is caused to be a swirl flow by the cylindrical blade portion and foreign matters such as liquid droplets are discharged toward a collection container in a separation chamber. The purified air is guided from a discharge pipe to the secondary port.

12 Claims, 11 Drawing Sheets

Figure 1:
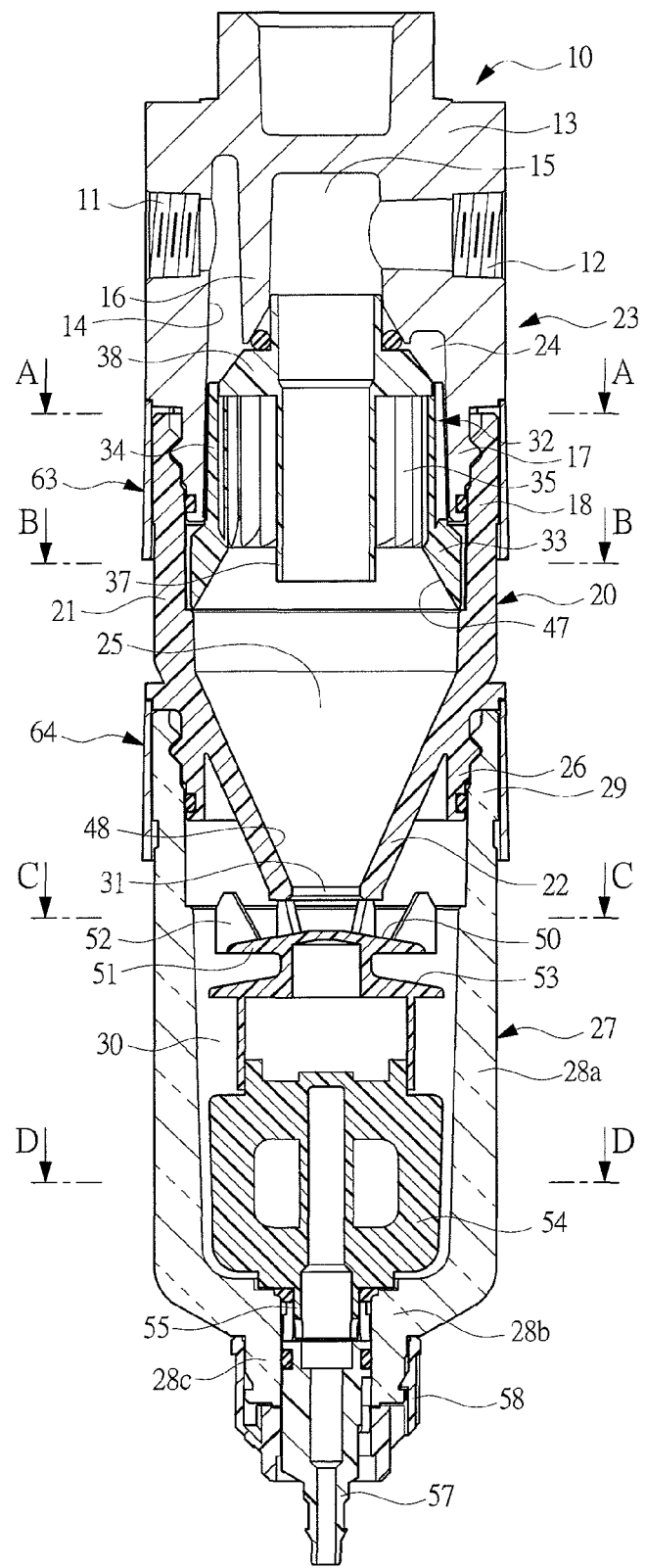

(51) Int. Cl.
   *B01D 45/16* (2006.01)
   *B04C 5/06* (2006.01)
   *B04C 5/13* (2006.01)
   *F04B 39/16* (2006.01)

(56) References Cited

U.S. PATENT DOCUMENTS

| 4,311,494 | A | 1/1982 | Conner et al. |
| 7,588,615 | B2* | 9/2009 | Gillenberg et al. ............ 55/423 |
| 2006/0037172 | A1 | 2/2006 | Choi |
| 2007/0137156 | A1* | 6/2007 | da Costa et al. ............ 55/486 |
| 2010/0043365 | A1 | 2/2010 | Fujiyama et al. |
| 2010/0186355 | A1 | 7/2010 | Fujiyama et al. |

FOREIGN PATENT DOCUMENTS

| JP | S48-64566 | 9/1973 |
| JP | S54-6682 | 1/1979 |
| JP | 61187910 | 8/1986 |
| JP | S61-130352 | 8/1986 |
| JP | 06174206 | 6/1994 |
| JP | H6-48867 | 7/1994 |
| JP | 7-328364 | 12/1995 |
| JP | H07328364 A | 12/1995 |
| JP | 2002058932 A | 2/2002 |
| JP | 2002102628 A | 4/2002 |
| JP | 2008-18336 A | 1/2008 |
| JP | 2008018337 A | 1/2008 |
| JP | 2010201280 A | 9/2010 |
| JP | 4591856 B1 | 12/2010 |
| JP | 2011-51055 | 3/2011 |
| JP | 2011041766 | 3/2011 |
| JP | 2011083696 A | 4/2011 |

OTHER PUBLICATIONS

Japanese Office Action dated Sep. 2, 2014 (2011-112765).
Chinese Office Action dated Sep. 3, 2014.

* cited by examiner

US 8,961,640 B2

FILTER

TECHNICAL FIELD

The present invention relates to a filter which is used to remove foreign matters, such as liquid droplets or dusts, from air to be supplied into a pneumatic device.

BACKGROUND ART

A pneumatic device, such as a pneumatic cylinder, is supplied with air from a pneumatic source via a pneumatic line such as piping or hose. By connecting the pneumatic source and the pneumatic device via the pneumatic line, a pneumatic circuit is formed. Air to be supplied from the pneumatic source to the pneumatic device is handled as air to be treated, and the pneumatic circuit is provided with a filter for removing foreign matters, such as water droplets or oil droplets or dusts, contained in the air to be treated.

As one type of the filter provided in the pneumatic circuit, Patent Document 1 discloses a filter having a main block, that is, a port block formed with a primary port and a secondary port, and a filter element attached to the port block. The filter element is adapted to remove foreign matters being composed of liquid droplets such as water droplets or dusts such as powdery and granular materials which are contained in the air to be treated and flowing from the primary port, and to discharge the purified air to the secondary port. In order to receive the foreign matters such as liquid droplets removed by the filter element, a filter bowl, namely, a collection container is attached to the port block.

As a filter to be used in the pneumatic circuit, forms being called air filter, mist filter, and micro mist filter are known, and these filters are defined according to foreign matter removal performance set on the basis of an inner diameter of air holes of a filter element or the like.

A filter adapted to swirl liquid to remove foreign matters mixed in liquid coolant is disclosed in Patent Document 2. This filter is adapted to swirl liquid to remove foreign matters from liquid on the basis of the differences in specific gravity and centrifugal force between the liquid and foreign matters.

PRIOR ART DOCUMENTS

Patent Documents

Patent Document 1: Japanese Patent Application Laid-Open Publication No. H07-328364
Patent Document 2: Japanese Patent Application Laid-Open Publication No. 2011-51055

DISCLOSURE OF THE INVENTION

Problems to be Solved by the Invention

To remove foreign matters by swirling the air containing foreign matters using a difference in centrifugal force of the air and the foreign matters, the air is blown out into a swirling chamber having a cylindrical shape from an air supply port in a tangential direction. It is difficult to reliably remove foreign matters in compressed air supplied into a pneumatic circuit by using such a foreign-matter removing method. This is because, as a large number of pneumatic equipment is incorporated in a pneumatic circuit in an assembly plant of electronic parts, the flow velocity of the air flowing in the pneumatic circuit is largely fluctuated depending on an operation state of the pneumatic equipment.

When a filter using centrifugal force is used to purify the air supplied into the pneumatic circuit in which the flow velocity may be largely fluctuated, centrifugal force applied on foreign matters is low when the flow velocity is low and it causes foreign matters such as liquid droplets to flow out from an air outflow port; thus, the processed air cannot be sufficiently purified. To prevent foreign matters from entering the air outflow port, it is required to make the inner diameter of the swirling chamber large, but it makes the filter to be large-sized. On the other hand, when the setting is such that the flow rate is low and a filter element is used for enhancing the separation effect, the more the flow velocity is increased, the lower the separation efficiency becomes; thus, it is required to make a flow-path area large for lowering the flow velocity and thus a size increase of the filter is unavoidable.

A preferred aim of the present invention is to separate and remove foreign matters such as liquid droplets contained in the air by using a small-sized filter.

Means for Solving the Problems

A filter according to the present invention is a filter for purifying the air by removing foreign matters such as liquid droplets or dusts contained in the air, the filter including: a port block provided with a primary port to which the air is supplied and a secondary port that causes purified air to flow out; a separation cylindrical unit provided to the port block to form a separation unit together with the port block and to form a swirl flow generating chamber having a cylindrical shape communicated with the primary port and a separation chamber communicating with the swirl flow generating chamber in the separation unit; a discharge pipe positioned at a central portion of the swirl flow generating chamber to guide purified air to the secondary port; and a cylindrical blade portion formed by arranging a plurality of blades in a cylindrical form, each of which extends in an axial direction along an inner peripheral surface of the swirl flow generating chamber and inclines in the circumferential direction, the filter swirling the air supplied from the primary port and inflowing into the swirl flow generating chamber in the axial direction for removing the foreign matter by causing the foreign matters contained in the air attached to the inner peripheral surface of the separation cylindrical unit.

The filter according to the present invention has a feature in causing the cylindrical blade portion swirl the air supplied from the primary port while flowing the air inward in a diameter direction. The filter according to the present invention has a feature in causing the cylindrical blade portion swirl the air supplied from the primary port while flowing the air outward in the diameter direction.

The filter according to the present invention has a feature in including: an annular base portion fitted with the inner peripheral surface of the separation unit arranged at a lower end of the cylindrical blade portion; and a closing lid portion arranged between the discharge pipe and an upper end of the cylindrical blade portion. The filter according to the present invention has a feature in including an annular base portion arranged at the lower end portion of the cylindrical blade portion and fixed to the discharge pipe; and a closing lid portion arranged between the inner peripheral surface of the separation unit and the upper end of the cylindrical blade portion. The filter according to the present invention has a feature in integrally forming the cylindrical blade portion and the annular base portion.

The filter according to the present invention has a feature in forming a notched portion at an upper end portion of each of the blades and fitting the closing lid portion with the notched portion. The filter according to the present invention has a feature in forming a liquid droplet discharge groove between an outer peripheral surface of the annular base portion and the separation unit. The filter according to the present invention has a feature in forming, to an upper surface of the annular base portion, a first liquid droplet guiding surface gradually inclined downward in a radially-inward direction so that the liquid droplet attached to the upper surface of the annular base portion is dropped downward by the first liquid droplet guiding surface. The filter according to the present invention has a feature in forming the lower surface of the closing lid portion in a perpendicular direction to a center axis of the separation unit from an outer peripheral portion to an inner peripheral portion or forming the lower surface of the closing lid portion inclined downward below the perpendicular direction from the outer peripheral portion to the inner peripheral portion.

Effects of the Invention

According to the present invention, in the separation unit including the swirl flow generating chamber having the cylindrical shape and the separation chamber, a swirl flow is generated by the air supplied from the primary port to the swirl flow generating chamber in the axial direction by the cylindrical blade portion inside the swirl flow generating chamber; thus, the swirl flow is formed toward the separation chamber by the whole of the circumferential direction of the cylindrical blade portion. In this manner, without increasing the inner diameter of the swirl flow generating chamber, a swirl flow can be generated and foreign matters such as water droplets contained in the air can be removed, thereby obtaining a small-sized filter excellent in separation performance.

BRIEF DESCRIPTIONS OF THE DRAWINGS

Figure 2:
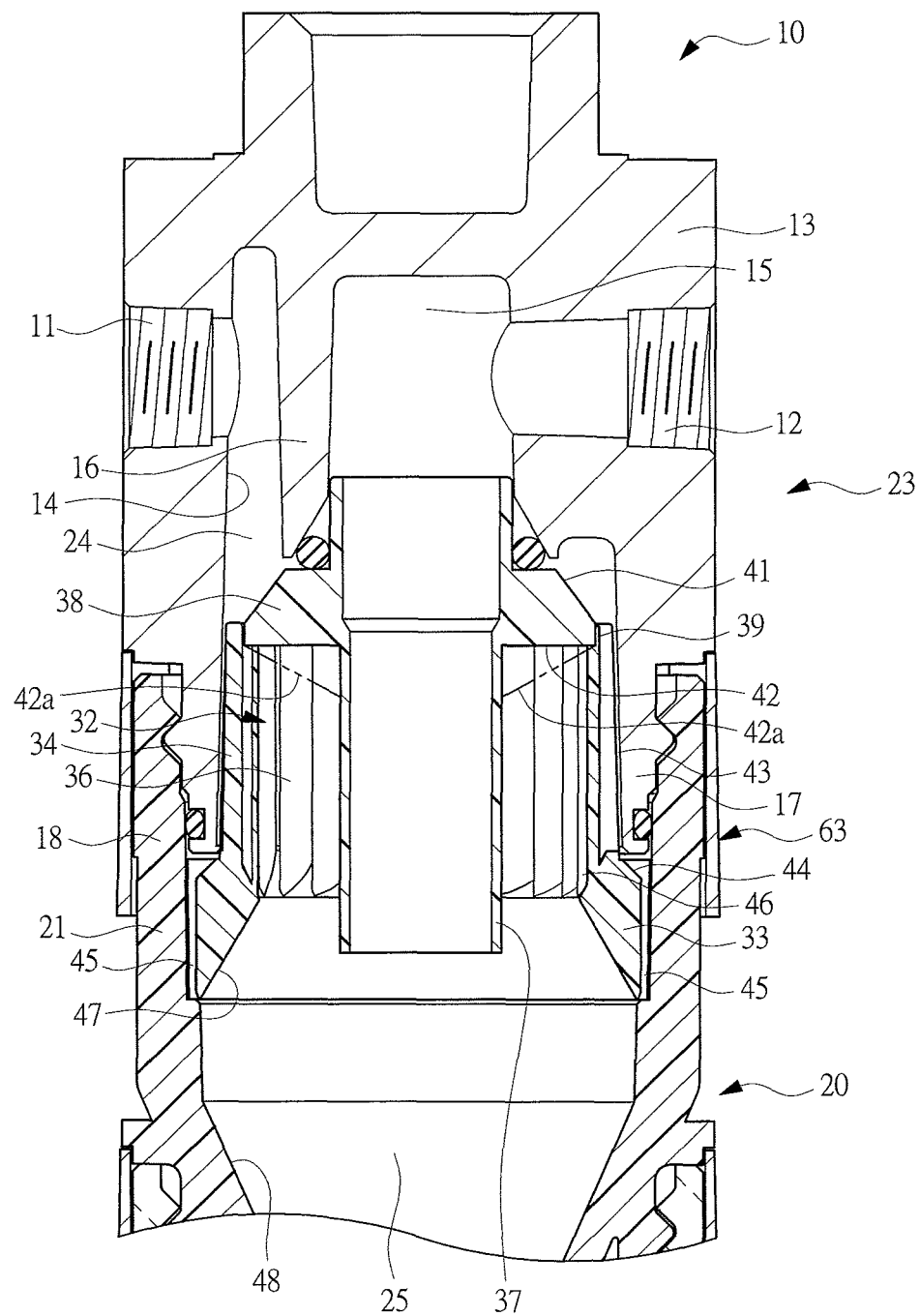
Figure 3:
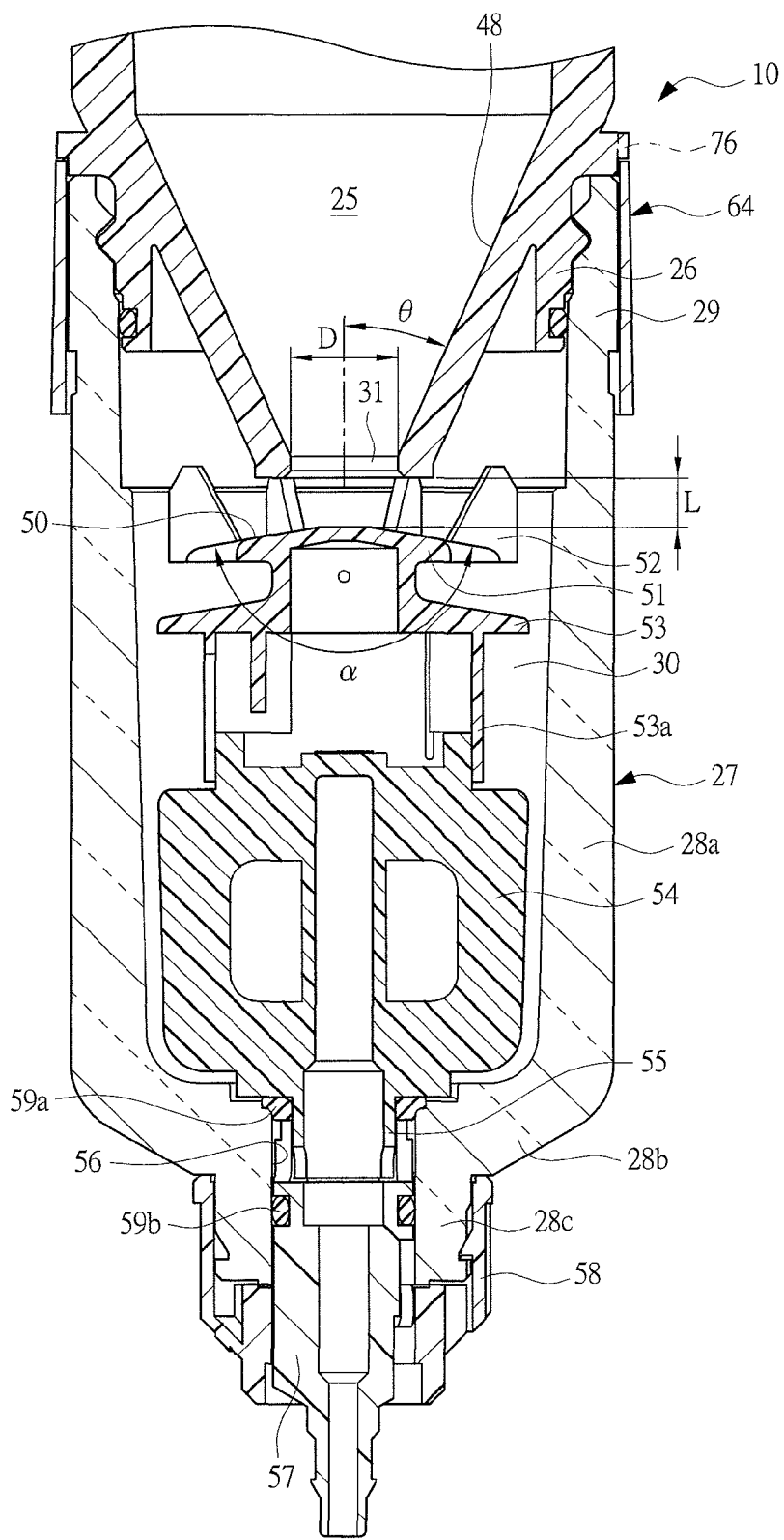
Figure 4:
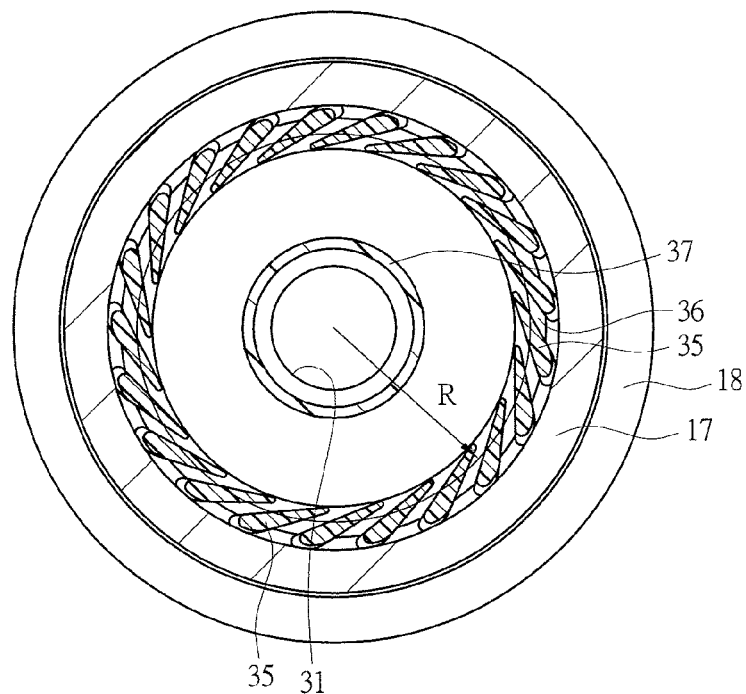
Figure 5:
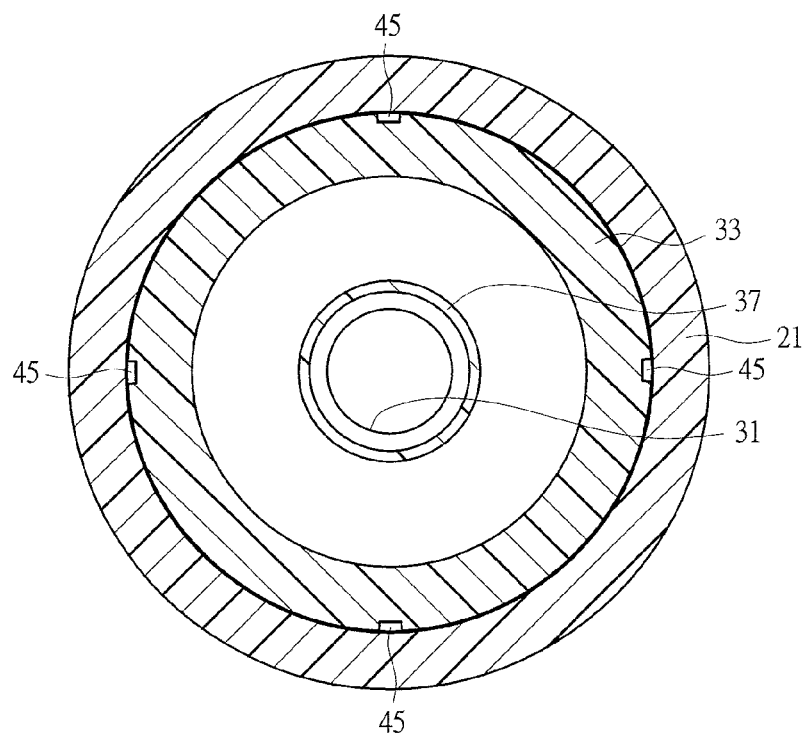
Figure 6:
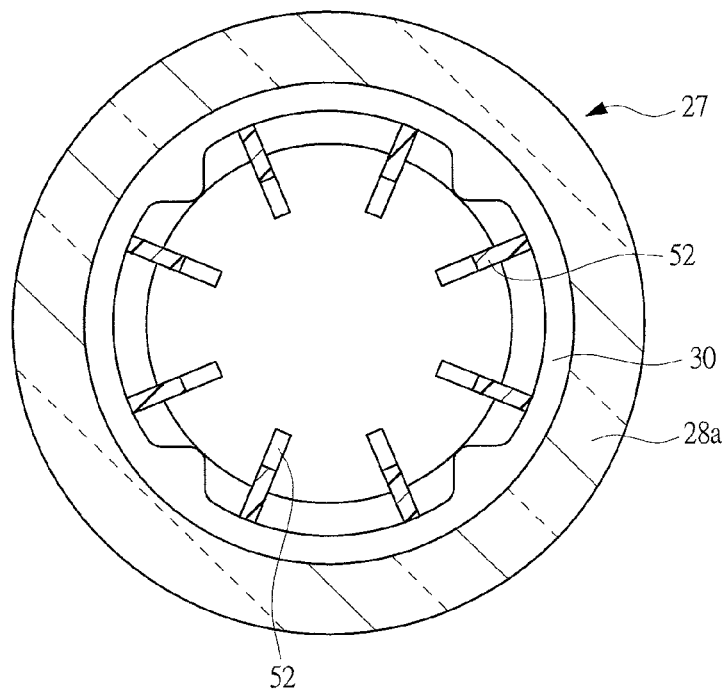
Figure 7:
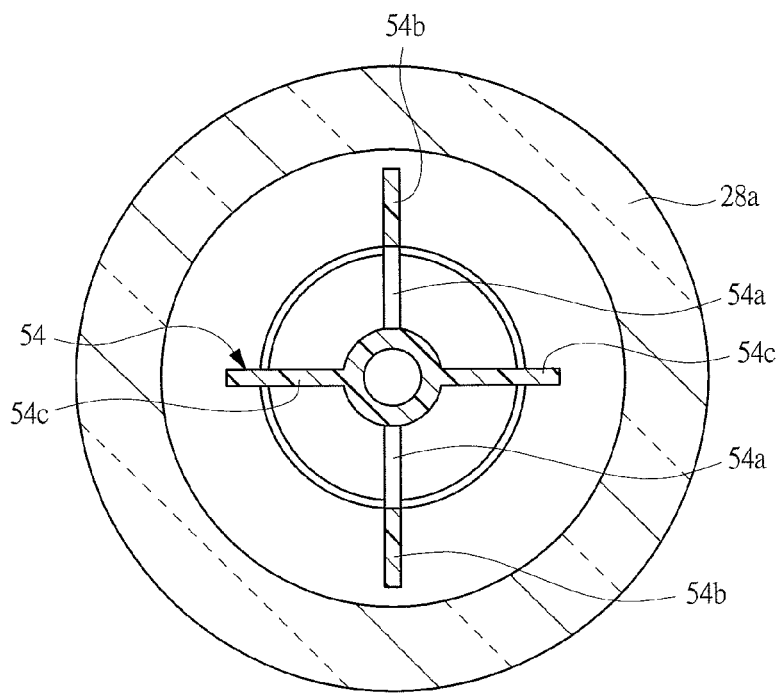
Figure 8:
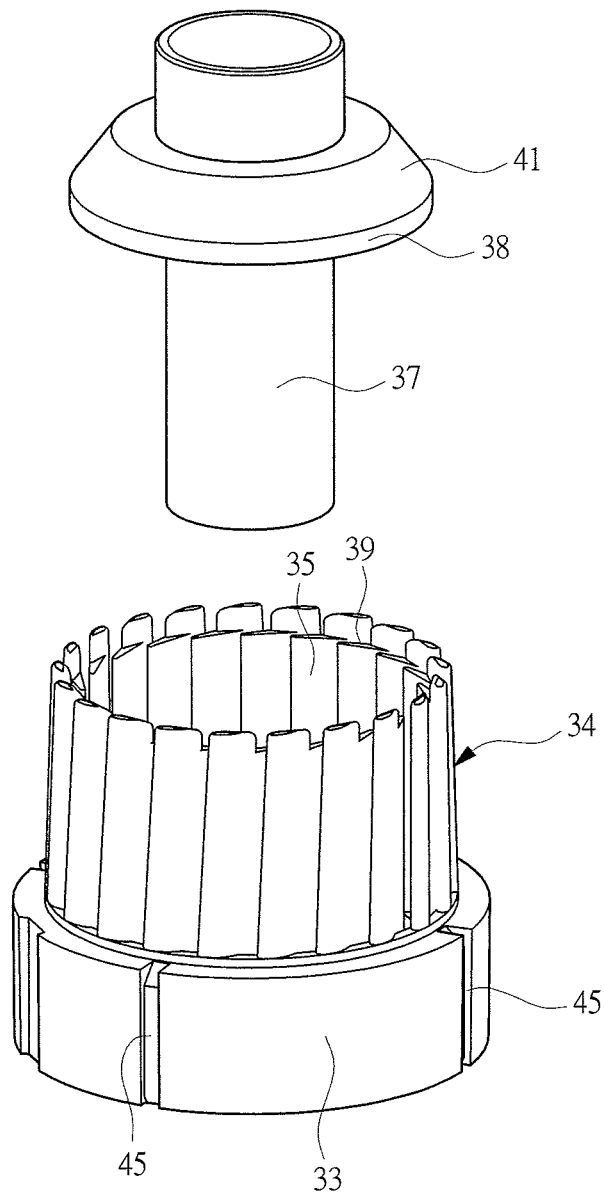
Figure 9:
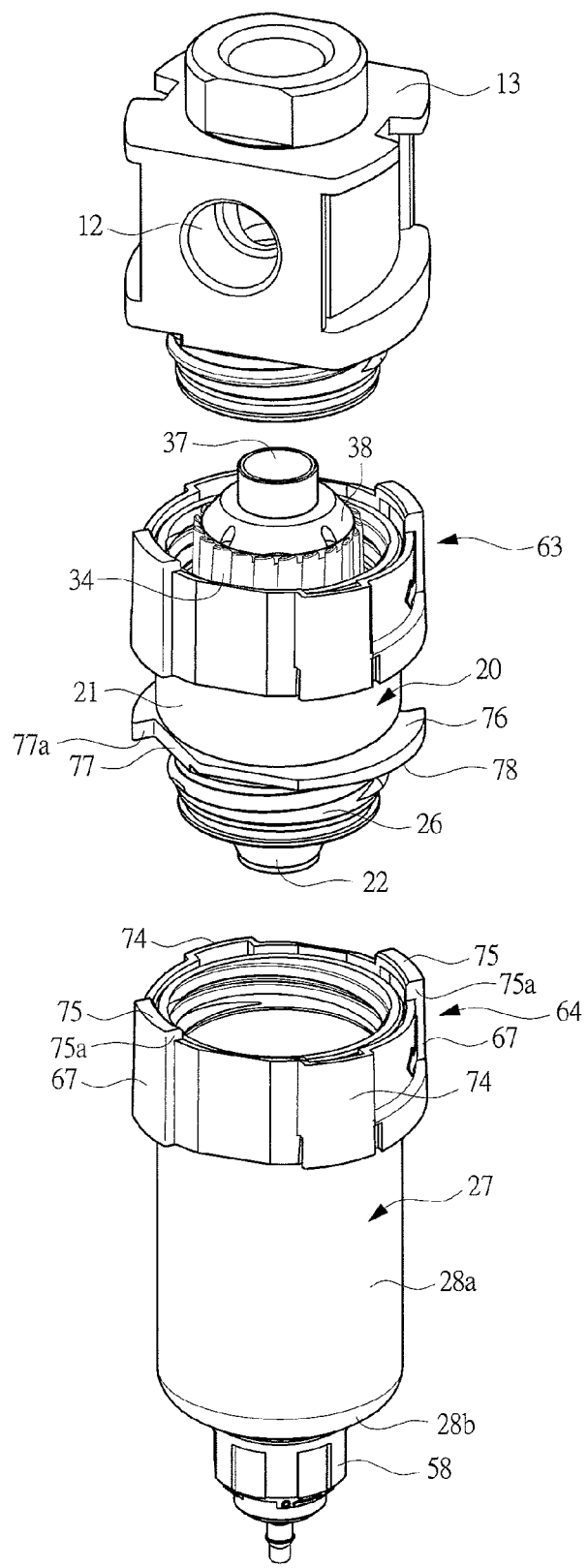
Figure 10:
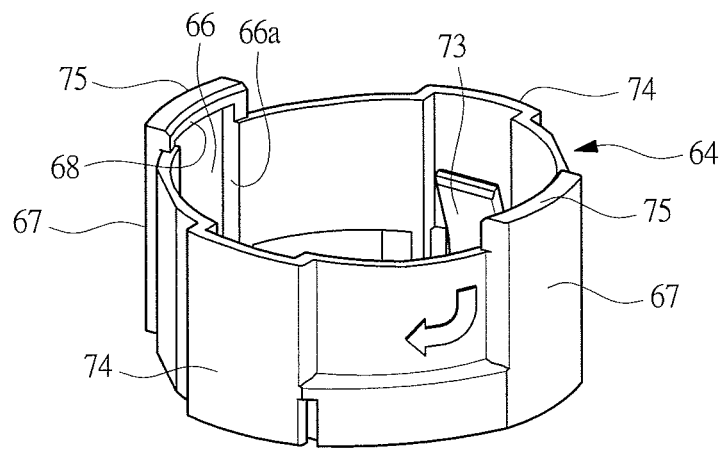
Figure 10:
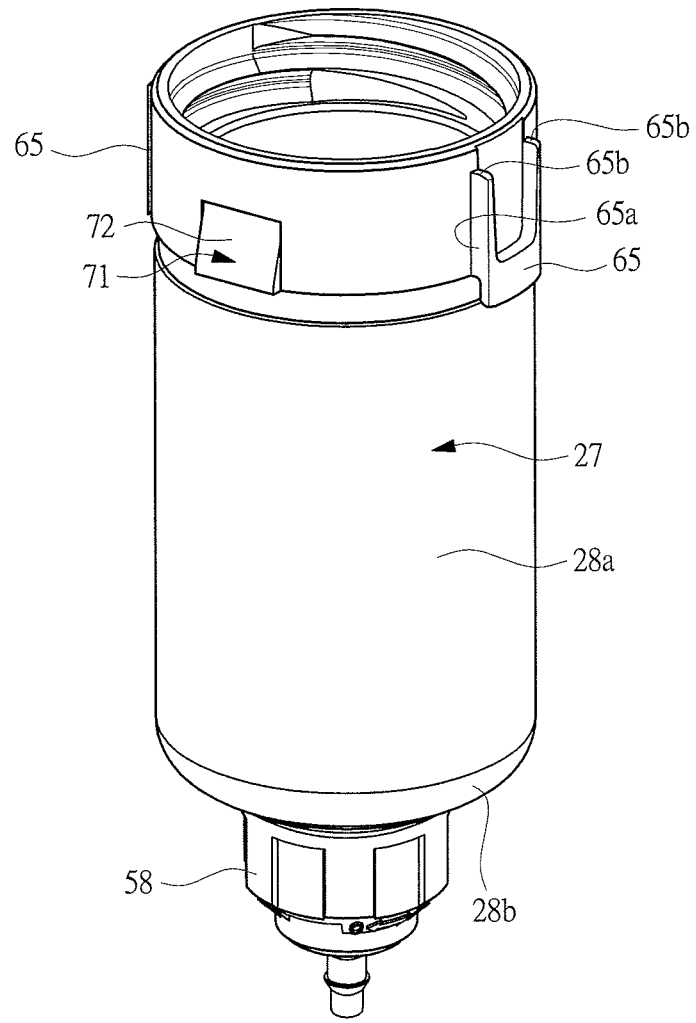
Figure 11:
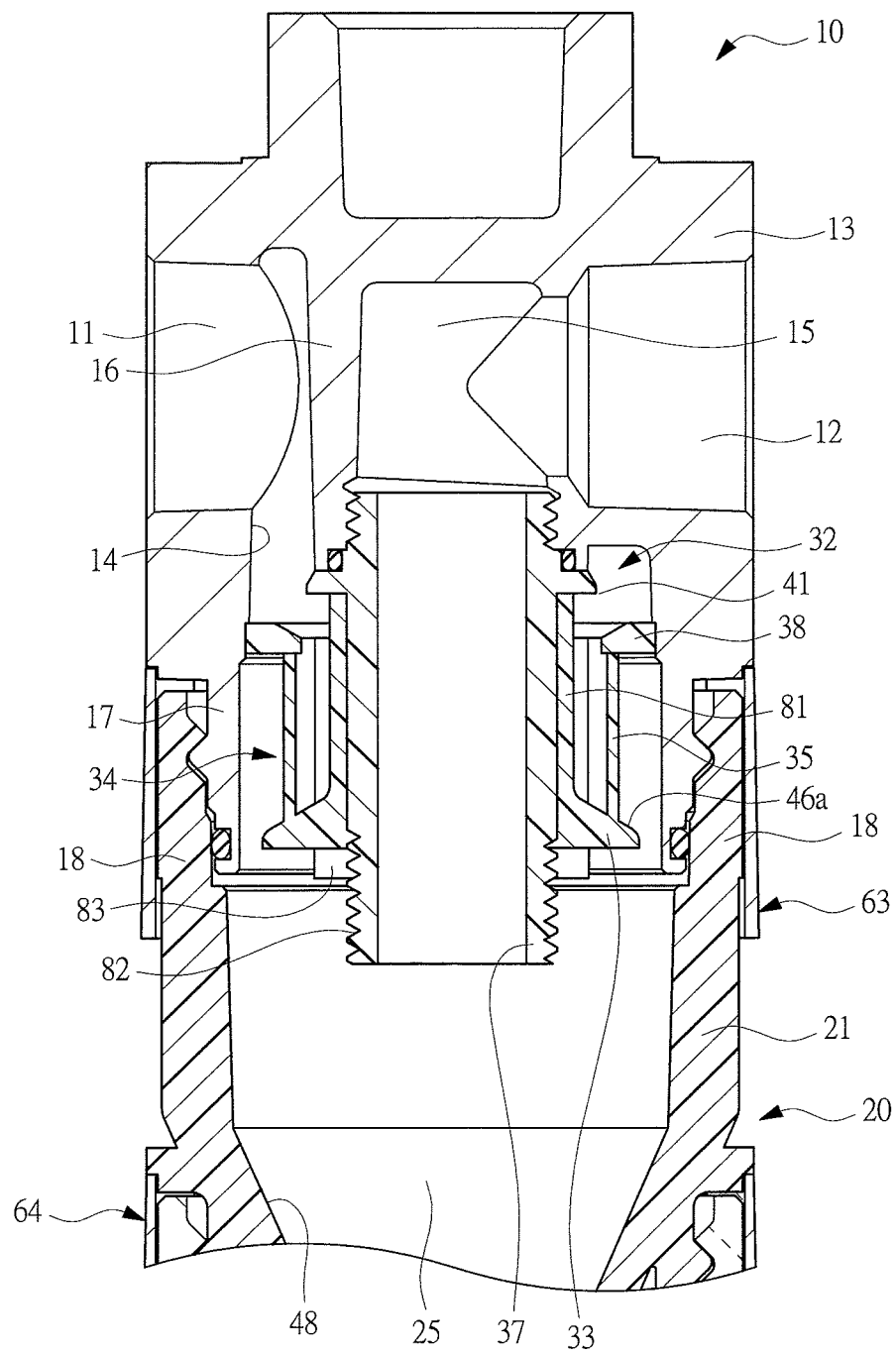
Figure 12:
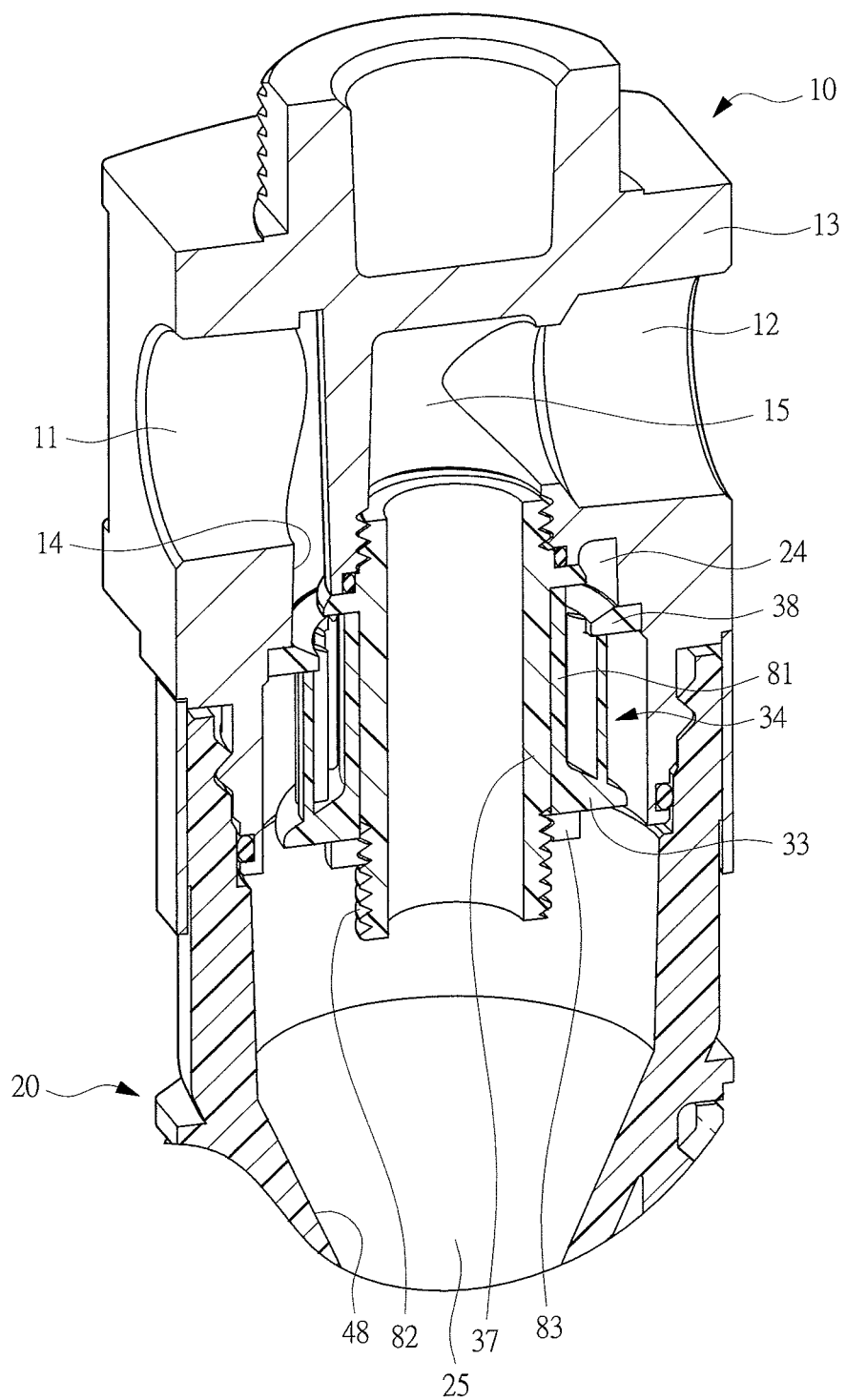
Figure 13:
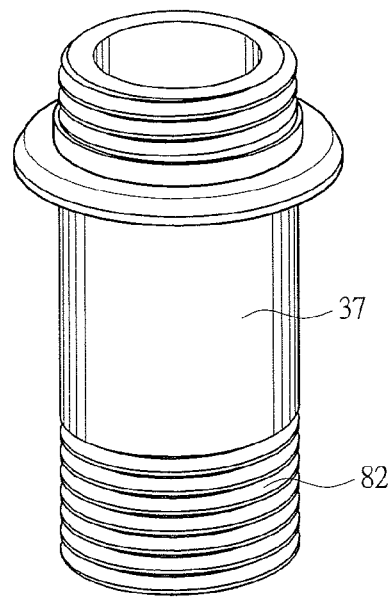
Figure 13:
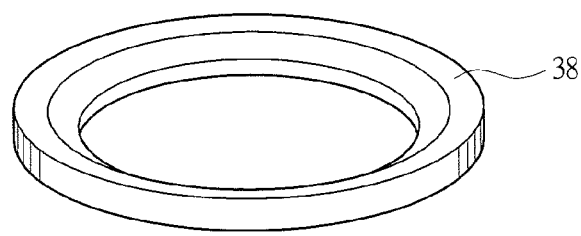
Figure 13:
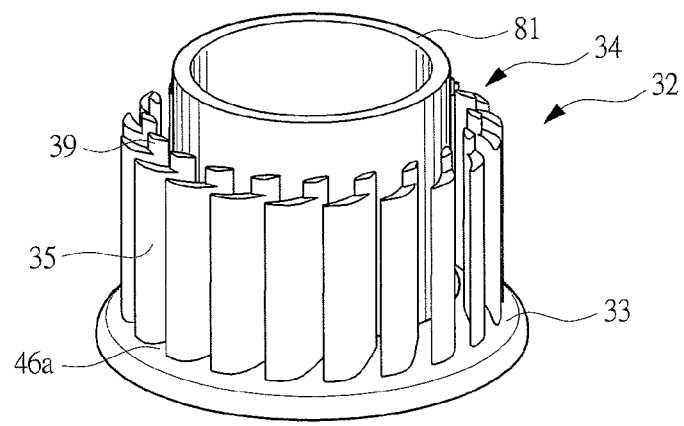
Figure 13:
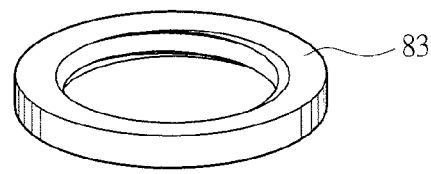

FIG. 1 is a cross sectional view showing a filter according to one embodiment of the present invention;
FIG. 2 is an enlarged sectional view showing the upper half of the filter shown in FIG. 1;
FIG. 3 is an enlarged sectional view showing the lower half of the filter shown in FIG. 1;
FIG. 4 is a cross sectional view taken along the line A-A in FIG. 1;
FIG. 5 is a cross sectional view taken along the line B-B in FIG. 1;
FIG. 6 is a cross sectional view taken along the line C-C in FIG. 1;
FIG. 7 is a cross sectional view taken along the line D-D in FIG. 1;
FIG. 8 is an exploded perspective view showing the swirl flow generator shown in FIGS. 1 and 2;
FIG. 9 is an exploded perspective view showing the filter;
FIG. 10 is an exploded perspective view showing a collection container and an annular lock member;
FIG. 11 is a cross sectional view showing the upper half of a filter according to another embodiment of the present invention;
FIG. 12 is a perspective view of FIG. 11; and
FIG. 13 is an exploded perspective view showing a swirl flow generator shown in FIGS. 10 and 11.

BEST MODE FOR CARRYING OUT THE INVENTION

Hereinafter, embodiments of the present invention will be described in detail with reference to the drawings. As shown in FIG. 1, a filter 10 has a port block 13 made of metal and formed with a primary port 11 and a secondary port 12. The primary port 11 is connected to a primary air pressure line composed of a piping not shown or the like, and air from an air pressure source is supplied to the primary port 11 via the air pressure line. The secondary port 12 is connected to a secondary air pressure line composed of a piping not shown or the like, and purified air from which liquid droplets and the like are removed is supplied to an external pneumatic device from the secondary port via the air pressure line. The primary port 11 and the secondary port 12 are coaxially opened at side surfaces of the port block 13 opposite to each other, respectively. Side surfaces of the port block 13 from which the respective ports are opened are formed in an approximately flat shape, and the port block 13 has a shape close to a cubic shape as a whole, as shown in FIG. 9.

The port block 13 is formed with a receiving hole 14 therein, and the primary port 11 is in communication with the receiving hole 14. A supporting portion 16 formed with a communication hole 15 is provided to a central portion of the port block 13, and air supplied to the primary port 11 flows to a lower portion of the receiving hole 14 via a communication space between the supporting portion 16 and the receiving hole 14.

A lower end portion of the port block 13 is provided with a cylindrical male screw portion 17. A separation cylinder 20 made of resin is detachably attached to the male screw portion 17, and an upper end portion of the separation cylinder 20 is provided with a female screw portion 18 which is screwed to the male screw portion 17. The separation cylinder 20 has a cylindrical portion 21 having a constant inner diameter, and a conical portion 22 continuously extending downward from a lower portion of the cylindrical portion 21 and having an inner diameter gradually reduced toward a lower end portion thereof. A separation unit 23 is composed of the port block 13 and the separation cylinder 20 attached to this block. The separation unit 23 is formed therein with an upper side swirl flow generating chamber 24 and a lower side separation chamber 25 which communicate with each other. The separation unit 23 shown in this figure is configured so that the swirl flow generating chamber 24 is formed of the port block 13 and the separation cylinder 20, but it may be configured so that the swirl flow generating chamber 24 is formed of the port block 13 and the separation chamber 25 is formed of the separation cylinder 20, or it may be configured so that the swirl flow generating chamber 24 and the separation chamber 25 are formed in the separation cylinder 20.

The conical portion 22 of the separation cylinder 20 is provided with a male screw portion 26, and the male screw portion 26 is the same in an outer diameter as the male screw portion 17 of the port block 13. A collection container 27 is detachably attached to the male screw portion 26. The collection container 27 has a cylindrical portion 28a and a bottom wall portion 28b integral with the cylindrical portion 28a, and is made of a transparent material. An upper end portion of the collection container 27 is provided with a female screw portion 29 which is screwed to the male screw portion 26. The female screw portion 29 is the same in an inner diameter as the female screw portion 18 of the cylindrical portion 21 of the separation cylinder 20. The collection container 27 is formed with a storage chamber 30 in which foreign matters such as liquid droplets are received, and the inside of the separation cylinder 20 and the storage chamber 30 are in communication with each other via a discharge port 31 formed at a lower end portion of the separation cylinder 20.

A swirl flow generator 32 made of resin is attached in the swirl flow generating chamber 24 of the separation unit 23. The swirl flow generator 32 has an annular base portion 33 which is fitted to an inner peripheral surface of the cylindrical portion 21 of the separation cylinder 20. The annular base portion 33 is integral with a cylindrical blade portion 34. As shown in FIGS. 2 and 4, the cylindrical blade portion 34 is provided with a plurality of wings, that is, blades 35 extending in an axial direction along an inner peripheral surface of the receiving hole 14, that is, an inner peripheral surface of the swirl flow generating chamber 24, and the blades 35 are formed and arranged in a cylindrical shape respectively at intervals of clearances 36. As shown in FIG. 4, each of the blades 35 has an inclination angle to a tangential line to the inner peripheral surface of the cylindrical blade portion 34. By providing the inclination angle in this manner, flow of air is changed to swirling flow. In addition, since many blades 35 are arranged over a whole circumference of the cylindrical blade portion 34 and have lengths in the axial direction, swirling flow can be obtained efficiently with a low pressure loss though the cylindrical blade portion 34 is thin in a radial direction. The cylindrical blade portion 34 is composed of twenty-one blades 35. As shown in FIG. 4, the respective blades 35 are set that wall thicknesses thereof on a radially inner side are thinner than those thereof on a radially outer side, and each clearance 36 formed between the respective blades extends along the central axis of the separation unit 23 in an axial direction and inclines in a circumferential direction.

A discharge pipe 37 is attached in the communication hole 15, and a lower end surface of the discharge pipe 37 extends beyond the cylindrical blade portion 34 downward to reach the position of the annular base portion 33. Air purified by separation of foreign matters is guided to the secondary port 12 via the discharge pipe 37. The discharge pipe 37 is integral with a closing lid portion 38, and this closing lid portion 38 is arranged at the upper end portions of the cylindrical blade portion 34. Air flowing from the primary port 11 into the receiving hole 14 is prevented by the closing lid portion 38 from flowing into the cylindrical blade portion 34 from a radial inner side of the cylindrical blade portion 34.

Thus, the swirl flow generator 32 is composed of the cylindrical blade portion 34 formed into a cylindrical shape as a whole, the annular base portion 33 arranged at the lower end portion of the cylindrical blade portion 34 and fitted into the inner peripheral surface of the cylindrical portion 21 of the separation cylinder 20, and the closing lid portion 38 arranged at the upper end portions of the cylindrical blade portion 34 and the discharge pipe 37. Therefore, air supplied from the primary port 11 into the receiving hole 14 flows in the swirl flow generating chamber 24 in the axial direction to flow from an upper outer peripheral surface of the cylindrical blade portion 34 into the clearances 36 among the blades 35. Air flowing in the respective clearances 36 is guided by the blades 35 to be jetted toward the inside of the cylindrical blade portion 34 in an inclined manner to the tangential direction. Therefore, swirling flow of air is produced inside the cylindrical blade portion 34, and the swirl flow flows into the lower-side separation chamber 25 in the separation cylinder 20 while being swirled. When the air flow is changed to the swirl flow, a centrifugal force applied to liquid droplets having a specific gravity larger than air is larger than that applied to air, so that the liquid droplets adhere to an inner peripheral surface of the conical portion 22. The liquid droplets adhered to the inner peripheral surface drop from the discharge port 31 into the storage chamber 30.

As described above, the cylindrical blade portion 34 formed by arranging the blades 35 in the cylindrical shape is integrated with the annular base portion 33, and the closing lid portion 38 integrated with the discharge pipe 37 is fitted into a distal end portion of the cylindrical blade portion 34. However, the cylindrical blade portion 34 and the closing lid portion 38 may be integrated with each other, and the annular base portion 33 may abut on the lower end surface of the cylindrical blade portion 34. Furthermore, the discharge pipe 37 and the closing lid portion 38 are integrated with each other. However, these members may be separated from each other.

As shown in figures, air flowed from the primary port 11 into the swirl flow generating chamber 24 flows from an outer peripheral portion of the swirl flow generating chamber 24 to the swirl flow generator 32 in the axial direction so that axial flow is changed into swirl flow by the blades 35. Since twenty-one blades 35 are arranged over the whole circumference of 360 degrees, inflow air is applied with a swirling force over the whole circumference of 360 degrees. Therefore, as compared with a case where air is caused to flow from an intake port to an inner peripheral surface of the separation cylinder 20 in a tangential direction as disclosed in Patent Document 2, a high speed swirl flow can be produced efficiently without making the inner diameter of the separation cylinder 20 large. Accordingly, the filter which forms swirl flow to remove liquid droplets contained therein can be made small in size.

The separation cylinder 20 has the cylindrical portion 21 and the conical portion 22 positioned at the bottom of the cylindrical portion 21, and the centrifugal force acting on swirl flow produced by the swirl flow generator 32 can be prevented from being attenuated at the conical portion 22. Therefore, when the lower portion of the separation cylinder 20 is formed in a conical shape, a separation efficiency of foreign matters due to adhesion of foreign matters such as liquid droplets to the inner peripheral surface can be made higher than that in such an aspect that the whole separation cylinder 20 is formed in a cylindrical shape. Air purified by removing foreign matters rises while being swirling to flow into the discharge pipe 37, and is discharged from the secondary port 12 to outside.

Notched portions 39 are formed on a radially-inner side of the upper end portion of the cylindrical blade portion 34. As shown in FIG. 4, an inner diameter of the notched portions 39 corresponds to an outer diameter R of the lower end portion of the closing lid portion 38, so that the closing lid portion 38 is fitted into the notched portions 39. Since the closing lid portion 38 is fitted into the inside of the upper end portion of the cylindrical blade portion 34 in this manner, the respective blades 35 are prevented from being deformed radially inward. A portion of an outer peripheral surface of the closing lid portion 38 located from a portion thereof above the upper end surface of the cylindrical blade portion 34 to the supporting portion 16 is formed as a taper surface 41 having a diameter reduced upwardly. Therefore, air flowed from the primary port 11 into the swirl flow generating chamber 24 is guided radially outward by the taper surface 41, then flows along the inner peripheral surface of the cylindrical blade portion 34 while flowing downward from the clearances 36 between the closing lid portion 38 and the receiving hole 14 along the respective blades 35, resulting in swirl flow of the flowed-in air.

A lower surface 42 of the closing lid portion 38 is formed in a flat surface extending from an outer peripheral portion to an inner peripheral portion so as to be at a right angle to the central axis of the closing lid portion 38 so that liquid droplets contained in the swirl flow do not adhere to the lower surface 42. Therefore, liquid droplets flowed together with air from the outer periphery of the closing lid portion 38 into the cylindrical blade portion 34 flow downward together with the swirl flow without adhering to the lower surface 42. According to an experiment, when the lower surface 42 is formed in an upwardly-inclined surface extending from the radially outer portion toward the radially inner portion, liquid droplets adhere to the lower surface 42. Furthermore, when the lower surface is formed with an annular groove, liquid droplets are captured in the annular groove, and therefore, the liquid droplets cannot be smoothly dropped. On the other hand, as shown in FIGS. 1 and 2, when the lower surface 42 is formed at a right angle to the central axis or when it is inclined downward from the radially outer portion toward the central portion as shown by a two-dot chain line 42a in FIG. 2, liquid droplets are prevented from adhering to the lower surface 42.

A clearance 43 is formed between the inner peripheral surface of the receiving hole 14 and the outer peripheral surface of the cylindrical blade portion 34. Liquid droplets mixed in air to be flowed from the primary port 11 into the swirl flow generating chamber 24 are partially guided by the clearance 43 between the blades 35 and the inner peripheral surface of the receiving hole 14 to flow to the lower end portions of the blades 35. As shown in FIG. 2, as part of an upper surface of the annular base portion 33, a second liquid droplet guiding surface 44 inclined downward as going radially outward is formed on the outside of the outer diameter of the cylindrical blade portion 34. As shown in FIG. 5, a plurality of liquid discharge grooves 45 are formed on an outer peripheral surface of the annular base portion 33, and liquid droplets which has flowed to reach the outermost peripheral portion of the second liquid droplet guiding surface 44 are guided from the respective liquid discharge grooves 45 to a lower portion of the separation cylinder 20. On the other hand, as part of the upper surface of the annular base portion 33, a first liquid droplet guiding surface 46 inclined downward as going radially inward is formed between the outer peripheral surface and the inner peripheral surface of the cylindrical blade portion 34.

Therefore, liquid droplets which have flowed downward via the clearances 36 among the blades 35 to reach the upper surface of the annular base portion 33 are dropped downward from the minimum diameter portion of the inclined first liquid droplet guiding surface 46. In this way, among liquid droplets such as water droplets and oil droplets which flow together with air from the primary port 11 into the swirl flow generating chamber 24, liquid droplets flowed between the outer peripheral surface of the cylindrical blade portion 34 and the receiving hole 14 are guided by the second liquid droplet guiding surface 44, and then guided from the liquid discharge grooves 45 to the inner peripheral surface of the separation cylinder 20. Therefore, they can be securely prevented from entering the discharge pipe 37. In particular, even if an amount of air supplied to the primary port 11 is rapidly increased, liquid droplets can be securely prevented from being captured in the discharge pipe 37. On the other hand, liquid droplets dropped along the blades 35 down to the first liquid droplet guiding surface 46 are guided by the first liquid droplet guiding surface 46 to drop below the annular base portion 33, so that liquid droplets can be securely prevented from being captured in the discharge pipe 37. As shown in FIG. 5, the number of liquid discharge grooves 45 provided is four, but the number may be set to an arbitrary number. Furthermore, the liquid discharge grooves 45 may be formed on the inner peripheral surface of the cylindrical portion 21.

A lower surface of the annular base portion 33 is formed as a taper surface 47 inclined downward so that an inner diameter thereof becomes larger from the minimum diameter portion of the first liquid droplet guiding surface 46 to the outer peripheral surface of the annular base portion 33. As described above, when the lower surface of the annular base portion 33 is formed as a diameter-enlarged portion expanded downward so that an inner diameter of the lower surface becomes larger downward, namely as the taper surface 47, air guided by the blades 35 to be changed to swirl flow is guided to the separation chamber 25 of the separation cylinder 20 while a swirling radius thereof becomes larger toward the taper surface 47. The lower end surface of the discharge pipe 37 is set to be the same axial position as that of the annular base portion 33, and a radially outer side of the lower end portion of the discharge pipe 37 corresponds to the annular base portion 33, but an inner surface of the annular base portion 33 is formed as such a taper surface 47 that an inner diameter thereof becomes larger downward, so that liquid droplets adhered to the taper surface 47 can be securely prevented from being captured into the discharge pipe 37. In particular, even if an amount of inflow air from the primary port 11 is rapidly increased, liquid droplets can be prevented from being captured in the discharge pipe 37.

In such a case that a distance between the inner peripheral surface of the annular base portion 33 and the outer periphery of the discharge pipe 37 is short, if the inner peripheral surface of the annular base portion 33 is made straight, there is such a possibility that liquid droplets are captured into the discharge pipe 37, but liquid droplets can be securely prevented from entering the discharge pipe 37 by forming the inner peripheral surface as the taper surface 47. The diameter-enlarged portion formed on the annular base portion 33 is not limited to the taper surface. If an inner diameter is set to be larger than the inner diameter of the cylindrical blade portion 34, even if a diameter-enlarged portion having a straight inner diameter is adopted, it can prevent liquid droplets from being captured into the discharge pipe 37.

Air flowed from the taper surface 47 into the separation chamber 25 and swirled along the inner peripheral surface of the cylindrical portion 21 is guided and swirled by the inner peripheral surface of the conical portion 22, namely a conical surface 48, having the inner diameter becoming smaller toward the lower end portion. In air flowing along the conical surface 48, centrifugal force generated is maintained, and liquid droplets contained in the air adhere to the conical surface 48 of the conical portion 22 to flow toward the discharge port 31 at the lower end portion.

As described above, by forming the second liquid droplet guiding surface 44 on a portion of the upper surface of the annular base portion 33 positioned radially outside and forming the first liquid droplet guiding surface 46 on a portion of the upper surface of the annular base portion 33 positioned radially inside, liquid droplets flowed down to the upper surface of the annular base portion 33 can be securely dropped downward.

A baffle plate 51 provided with a liquid guiding surface 50 opposed to the discharge port 31 is disposed in the collection container 27. As shown in FIG. 3, liquid droplets dropped from the discharge port 31 stay on the bottom of the storage chamber 30, and liquid droplets on the bottom of the storage chamber 30 are prevented from flowing back into the separation chamber 25 due to cyclone effect of the swirl flow, since the baffle plate 51 is opposed to the discharge port 31 via a clearance of a baffle arrangement distance L. Eight fins 52 extending in a radial direction of the liquid guiding surface 50 and projecting upward, respectively, are provided radially on the liquid guiding surface 50 of the baffle plate 51, as shown in FIGS. 3 and 6. Thus, air in the storage chamber 30 is prevented from being swirled in accordance with air swirled in the discharge port 31 by the plurality of radial fins 52. Thus, liquid in the storage chamber 30 is prevented by the baffle plate 51 provided with fins 52 from being whirled up by the cyclone effect due to swirling of air in the storage chamber 30 and being flowed out to the secondary port 12. Furthermore, air swirled downward along the conical surface 48 is reflected by the baffle plate 51 in a reverse direction and moved upward toward the discharge pipe 37.

The baffle plate 51 is integrated with a base plate 53 which is located just below the baffle plate 51, and which has a diameter larger than that of the baffle plate 51. As shown in FIG. 7, a cross-shaped leg portion 54 is attached to the base plate 53 via a coupling portion 53a shown in FIG. 3. The leg portion 54 includes four plate-like members extending radially from a radial central portion of the leg portion 54. The leg portion 54 is composed of two large-diameter plates 54b extending near the inner peripheral surface of the collection container 27 and having a notch hole 54a near the axial center of the leg portion 54 and two small-diameter plates 54c having a large clearance between the inner peripheral surface of the collection container 27 and each of the small-diameter plates 54c. Therefore, air is securely prevented from being swirled in the storage chamber 30. A coupling portion 55 provided at the lower portion of the leg portion 54 is assembled in a discharge hole 56 formed in a bottom wall portion 28b of the collection container 27, and a discharge pipe 57 inserted into a lower side of the discharge hole 56 is coupled to the coupling portion 55. The discharge pipe 57 is engaged with a cam portion of an operation knob 58 rotatably attached on an outer periphery of a discharge port 28c provided on the bottom wall portion 28b, so that the discharge pipe 57 is moved vertically by operating the operation knob 58 in a rotating manner. When the discharge pipe 57 is moved upward by the operation knob 58, a seal member 59a provided on the coupling portion 55 is separated from the bottom wall portion 28b. Therefore, liquid in the storage chamber 30 is drained outside via the discharge pipe 57.

As shown in FIG. 3, when the inner diameter of the discharge port 31 of the separation cylinder 20 is represented as "D" and an conical angle of the conical portion 22 of the lower end portion of the separation cylinder 20 is represented as "θ", the inner diameter D and the conical angle θ are set to 6.5 to 9 mm and 20 to 30 degrees, respectively. Therefore, it is confirmed that liquid droplets could be caused to adhere to the inner surface of the conical portion 22 and the adhered liquid droplets could be drained from the discharge port 31 to the storage chamber 30, so that a liquid droplets removal effect could be enhanced.

When a surface angle of the liquid guiding surface 50 of the baffle plate 51 is represented as a and a baffle arrangement distance between the discharge port 31 and the liquid guiding surface 50 is represented as L, the surface angle α and the baffle arrangement distance L are set to 90 to 180 degrees and 5 to 15 mm, respectively. Therefore, liquid droplets dropped downward from the discharge port 31 are securely prevented from moving upward and flowing back into the separation chamber 25. When the baffle arrangement distance L is set to be shorter than 5 mm, there is a possibility that liquid droplets adhered to the liquid guiding surface 50 of the baffle plate 51 flows back into the separation cylinder 20. On the contrary, when the baffle arrangement distance L is set to be larger than 15 mm, there is such a possibility that liquid droplets passed through the discharge port 31 stay on the liquid guiding surface 50, and the liquid droplets stayed are moved upward and scattered by the cyclone effect due to change of a flow rate or the like so that they flow back from the discharge port 31 into the separation cylinder 20. Regarding the surface angle α, liquid droplets can be securely prevented from flowing back from the baffle plate 51 by setting the surface angle α to the above-described angle range.

As shown in FIG. 1, on an outside of the female screw portion 18 of the separation cylinder 20, an annular lock member 63 made of resin is movably attached in the axial direction in order to lock a state where the separation cylinder 20 is fastened to the male screw portion 17 of the port block 13 and release the lock state performed when the separation cylinder 20 is detached from the port block 13. Similarly, on an outside of the female screw portion 29 of the collection container 27, an annular lock member 64 made of resin is movably attached in the axial direction in order to lock a state where the collection container 27 is fastened to the male screw portion 26 of the separation cylinder 20 and release the lock state performed when the collection container 27 is detached from the separation cylinder 20. The respective annular lock members 63 and 64 have the same structure as each other.

FIG. 10 is an exploded perspective view of the collection container 27 and the annular lock member 64, where two convex guide portions 65 are provided on an outer peripheral surface of the collection container 27 so as to be shifted from each other by an angle of 180° in a circumferential direction, and a concave guide portion 66 in which the convex guide portion 65 is inserted is formed on an inner peripheral surface of the annular lock member 64, as shown in FIG. 10. Therefore, the annular lock member 64 is moved outside the collection container 27 in the axial direction while being guided by the convex guide portions 65 inserted into the concave guide portions 66. Outer surfaces of portions of the annular lock member 64 corresponding to the concave guide portions 66 are formed as projecting portions 67 projecting radially outward in order to make a wall thickness of resin even. A side wall 66a of the concave guide portion 66 comes in contact with a side surface 65a of the convex guide portion 65, so that rotation of the annular lock member 64 is prevented by both the guide portions 65 and 66. Outer surfaces of portions of the annular lock member 64 corresponding to the concave guide portions 66 are formed as projecting portions 67 projecting radially outward in order to make a wall thickness of resin even. A stopper 68 on which an end portion 65b of the convex guide portion 65 abuts is provided on the concave guide portion 66, and the stopper 68 abuts on the end portion 65b of the guide portion 65 so that the position of the annular lock member 64 in a direction toward the bottom wall portion 28b of the collection container 27 is restricted.

Two inclination projections 71 are provided on an outer peripheral surface of the collection container 27 so as to be shifted from the convex guide portion 65 by an angle of 90 degrees in a circumferential direction. The inclination projection 71 has an inclination surface 72 inclined radially outward toward the bottom portion of the collection container 27. On the other hand, tongue pieces 73, each inclining upward and radially inward and contacting with the inclination surface 72, are provided on an inner peripheral surface of the annular lock member 64 so as to project toward the inside of the annular lock member 64. A portion of the annular lock member 64 which is provided with the tongue piece 73 is recessed, and an outer surface of a portion of the annular lock member 64 corresponding to the recessed portion is formed as a projecting portion 74.

The tongue piece 73 is made of elastically-deformable resin material and is formed integrally with the annular lock member 64, and a distal end side thereof is elastically deformed so as to displace in a radial direction. The tongue piece 73 is formed so that its distal end, namely, an inclination distal end is inclined radially inward. Since the annular lock member 64 integrated with the tongue pieces 73 is molded by elastically-deformable resin, an inclination distal end of the tongue piece 73 can be deformed by a radially outward force. Therefore, when the annular lock member 64 is moved in the longitudinal direction toward the bottom portion of the collection container 27, the distal end side of the tongue piece 73 is elastically deformed so as to slide along the inclination surface 72 to displace radially outward. A pressing force toward an opening end portion of the collection container 27 is biased to the annular lock member 64 by repulsive force of the elastically deformed tongue piece 73. Therefore, when the annular lock member 64 is released from a hand of an operator under such a state that the annular lock member 64 has been moved manually toward the bottom portion of the collection container 27 to a lock release position, the annular lock member 64 is automatically returned to its original position by the pressing force. Thus, a pressing member which presses the annular lock member 64 toward the port block 13 is formed of the tongue piece 73 and the inclination projection 71 having the inclination surface 72.

The projecting portion 67 including the concave guide portion 66 on the inner surface thereof is protruded beyond an end surface of the annular lock member 64 axially outward toward the port block 13, and a protruded end portion of the projecting portion 67 constitutes a movable side engagement portion 75. On the other hand, a flange 76 provided on the separation cylinder 20 is formed with a notched portion engaged with the movable side engagement portion 75, and the notched portion constitutes a fixation side engagement portion 77. As shown in FIG. 9, a lower surface of the flange 76 constitutes an abutting end surface 78 on which the annular lock member 64 is caused to abut, and the fixation side engagement portion 77 is formed with a first stopper surface 77a. On the other hand, a side surface of the movable side engagement portion 75 constitutes a second stopper surface 75a opposed to the first stopper surface 77a.

The annular lock member 63 also has the same shape as the annular lock member 64, and a guide portion similar to the convex guide portion 65 shown in FIG. 10 is provided on an outer peripheral surface of the cylindrical portion 21 of the separation cylinder 20 and an inclination projection 71 similar to the inclination projection 71 is provided thereon. A movable side engagement portion similar to the movable side engagement portion 75 of the annular lock member 64 is also provided on the annular lock member 63, and the movable side engagement portion is engaged with a fixation side engagement portion provided on the port block 13.

FIG. 11 is a cross sectional view showing the upper half of a filter according to another embodiment of the present invention, FIG. 12 is a perspective view of FIG. 11, and FIG. 13 is an exploded perspective view showing a swirl flow generator shown in FIGS. 11 and 12.

The swirl flow generator 32 shown in FIGS. 11 to 13 is configured to jet air in a radially outward direction of the cylindrical blade portion 34 to generate swirl flow, which is different from the swirl flow generator 32 of the filter 10 shown in FIG. 1 which is configured so as to jet air in a radially inward direction of the cylindrical blade portion 34 to generate swirl flow.

As shown in the figures, a cylindrical sleeve 81 is provided integrally with the annular base portion 33 of the swirl flow generator 32, and the sleeve 81 is fitted and fixed to the outside of the discharge pipe 37. The annular base portion 33 is fixed to the discharge pipe 37 by a nut 83 screwed to a male screw 82 formed on the discharge pipe 37. The annular base portion 33 is integrated with the cylindrical blade portion 34, and the cylindrical blade portion 34 is composed of a plurality of blades 35 extending along the sleeve 81 outside thereof in an axial direction.

In order to supply air from an upper end of the cylindrical blade portion 34 along the sleeve 81 in the axial direction, the air having flowed from the primary port 11 into the receiving hole 14, an annular closing lid portion 38 is arranged inside the receiving hole 14, and an inner-periphery side lower surface of the closing lid portion 38 is caused to abut on an outer peripheral portion of an upper end of the cylindrical blade portion 34. Notched portions 39 on which the closing lid portion 38 abuts are formed on an outer peripheral portion of the upper end of the cylindrical blade portion 34.

A liquid droplet guiding surface 46a that is inclined downwardly and radially outwardly from a lower end portion of the sleeve 81 is formed on the annular base portion 33, so that liquid droplets in air guided by the blades 35 to reach the lower end portion of the cylindrical blade portion 34 flow along the inclined liquid droplet guiding surface 46a to drop into the separation chamber 25. Since the dropping position is away from the discharge pipe 37, liquid droplets are prevented from entering the discharge pipe 37. In addition, since the inside of the cylindrical portion 21 is formed as a diameter-enlarged portion which is set so that the inner diameter of the cylindrical portion 21 is larger than the inner diameter of the swirl flow generating portion inside the male screw portion 17, and the lower end portion of the discharge pipe 37 is positioned in the diameter-enlarged portion, liquid droplets can be prevented from entering the discharge pipe 37.

Thus, as the cylindrical blade portion 34, there are the first aspect where air flowing in the axial direction is swirled while being caused to flow radially inward, and the second aspect where the air is swirled while being caused to flow radially outward.

The present invention is not limited to the above-described embodiments and may be modified variously without departing from the gist of the present invention. For example, though a manual drain mechanism is provided in the collection container 27 in order to discharge liquid accumulated in the collection container 27 outside, an automatic drain mechanism or a semi-automatic drain mechanism may be provided in the collection container.

INDUSTRIAL APPLICABILITY

The filter is used, in a pneumatic system including a pneumatic power source and a pneumatic device operated by compressed air supplied from the pneumatic power source, for removing foreign matters such as liquid droplets contained in the compressed air.

What is claimed is:
1. A filter for removing foreign matter contained in air to purify the air, comprising:
    a separation unit including a primary port to which the air is supplied, a cylindrical swirl flow generating chamber communicating with the primary port via a receiving hole located above the swirl flow generating chamber, a separation chamber located below the swirl flow generating chamber and communicating with the swirl flow generating chamber, and a secondary port causing purified air in the separation chamber to flow out;
    a discharge pipe arranged at a central portion of the swirl flow generating chamber to guide purified air to the secondary port; and
    a cylindrical blade portion formed by arranging a plurality of blades in a cylindrical form, each of which extends in an axial direction along an inner peripheral surface of the swirl flow generating chamber and inclines in the circumferential direction, wherein the air supplied from the primary port and inflowing into the swirl flow generating chamber in the axial direction is swirled to remove foreign matters contained in the air, wherein the cylindrical blade portion swirls the air supplied from the primary port while letting the air flow in a radially-inward direction.

2. A filter for removing foreign matter contained in air to purify the air, comprising:

a separation unit including a primary port to which the air is supplied, a cylindrical swirl flow generating chamber communicating with the primary port via a receiving hole located above the swirl flow generating chamber, a separation chamber located below the swirl flow generating chamber and communicating with the swirl flow generating chamber, and a secondary port causing purified air in the separation chamber to flow out;

a discharge pipe arranged at a central portion of the swirl flow generating chamber to guide purified air to the secondary port; and a cylindrical blade portion formed by arranging a plurality of blades in a cylindrical form, each of which extends in an axial direction along an inner peripheral surface of the swirl flow generating chamber and inclines in the circumferential direction, wherein the air supplied from the primary port and inflowing into the swirl flow generating chamber in the axial direction is swirled to remove foreign matters contained in the air, wherein the cylindrical blade portion swirls the air supplied from the primary port while letting the air flow in a radially-outward direction.

3. The filter according to claim 1, comprising: an annular base portion which is arranged at a lower end of the cylindrical blade portion and fitted to an inner peripheral surface of the separation unit; and a closing lid portion arranged between the discharge pipe and an upper end of the cylindrical blade portion.

4. The filter according to claim 2, comprising: an annular base portion arranged at a lower end of the cylindrical blade portion and fixed to the discharge pipe; and a closing lid portion arranged between an inner peripheral surface of the separation unit and an upper end of the cylindrical blade portion.

5. The filter according to claim 3, wherein the cylindrical blade portion and the annular base portion are integrally formed.

6. The filter according to claim 4, wherein the cylindrical blade portion and the annular base portion are integrally formed.

7. The filter according to claim 5, wherein notched portions are formed at an upper end portion of each of the blades and the closing lid portion is fitted to the notched portion.

8. The filter according to claim 6, wherein notched portions are formed at an upper end portion of each of the blades and the closing lid portion is fitted to the notched portion.

9. The filter according to claim 5, wherein a liquid discharge groove is formed between an outer peripheral surface of the annular base portion and the separation unit.

10. The filter according to claim 6, wherein a liquid discharge groove is formed between an outer peripheral surface of the annular base portion and the separation unit.

11. The filter according to claim 3, wherein a first liquid droplet guiding surface gradually inclined downward in a radially-inward direction is formed to an upper surface of the annular base portion so that liquid droplets attached to the upper surface of the annular base portion are dropped downward by the first liquid droplet guiding surface.

12. The filter according to claim 3, wherein the lower surface of the closing lid portion is formed in a perpendicular direction to a central axis of the separation unit from an outer peripheral portion to an inner peripheral portion or formed to be inclined downward below the perpendicular direction from an outer peripheral portion to an inner peripheral portion.

\* \* \* \* \*